United States Patent [19]

Tomoshige et al.

[11] Patent Number: 4,747,460
[45] Date of Patent: May 31, 1988

[54] FAIL-SAFE CIRCUIT OF A FIXED SPEED TRAVELING APPARATUS

[75] Inventors: Hideki Tomoshige; Kou Tanigawa, both of Kobe; Shigetaka Akahori, Toyota, all of Japan

[73] Assignees: Fujitsu Ten Limited, Hyogo; Toyota Jidosha Kabushiki Kaisha, Aichi, both of Japan

[21] Appl. No.: 865,862

[22] Filed: May 22, 1986

[30] Foreign Application Priority Data

May 24, 1985 [JP] Japan ................................. 60-111575

[51] Int. Cl.$^4$ ............................................. B60K 31/10
[52] U.S. Cl. ..................................... 180/176; 180/177; 123/350
[58] Field of Search .............. 180/174, 175, 176, 177, 180/178, 179; 123/349, 350, 352

[56] References Cited

U.S. PATENT DOCUMENTS

| 4,106,584 | 8/1978 | Matsubara | 180/177 |
| 4,158,398 | 6/1974 | Riddel | 180/177 |
| 4,312,419 | 1/1982 | Noddings | 180/177 |
| 4,345,663 | 8/1982 | Shields | 180/177 |

*Primary Examiner*—John J. Love
*Assistant Examiner*—Richard Camby
*Attorney, Agent, or Firm*—Wenderoth, Lind & Ponack

[57] ABSTRACT

A fail-safe circuit of a fixed speed traveling apparatus wherein there are provided with a control valve for introducing an engine negative pressure to an actuator which controls a throttle opening degree, a release valve for introducing an atmospheric pressure to an actuator and a control circuit for controlling the control valve and the release valve. At brake ON, a first cancel signal is supplied to the control circuit for canceling a fixed speed traveling and to open a current passage of the release valve. A second cancel signal is generated to the control circuit in the case where the current passage of the release valve is open.

8 Claims, 3 Drawing Sheets

FAIL-SAFE CIRCUIT OF A FIXED SPEED TRAVELING APPARATUS

BACKGROUND OF THE INVENTION

1. Field of the Invention

This invention relates to a fail-safe circuit of a fixed speed traveling apparatus for automobile.

2. Description of the Prior Art

One type of fixed speed traveling apparatus for automobile is widely used to control the traveling car speed always at a preset speed automatically by storing the preset speed, and it generally possesses a resume switch function which once cancels the fixed speed traveling control when the brake is applied during fixed speed traveling and returns to the same preset car speed or not depending on the judgement of the driver.

In a system where the cancel signal is generated from a stop lamp switch, since it is presumed that a microprocesser or central processing unit(referred to as CPU) does not accomplish cancel operation normally when the CPU receives the cancel signal, its safety is enhanced by combining with a hardware circuit as its backup use.

A typical conventional prior art is shown in FIG. 1, in which there are provided a fixed speed traveling control apparatus 1, CPU 11 as its control center, and a fail-safe circuit 12 for backup use. This fail-safe circuit 12 is often integrated into the custom integrated circuit(referred to as IC) together with power source control circuit and others of CPU 11. The CPU 11 possesses a program for fixed speed traveling control, and when a voltage +B is applied from a stop lamp switch A(normally OFF) which is turned ON when the brake pedal is stepped on, it is used as cancel signal C1, and the fixed speed traveling control is interrupted. This switch A is provided for lighting up the stop lamps L in the rear part of the car.

The fixed speed traveling control is effected by varying the value of engine negative pressure, namely intake pressure of a intake manifold to be introduced into an actuator(not shown) for control of throttle opening degree through a control valve 22. As a result, a duty control signal b generated by prececution of the fixed speed traveling program of CPU 11 is delivered, and is supplied into transistor Tr1 through OR gate G1, and this transistor passes a pulsive current to the control valve 22. As the duty of this current varies depending on the control signal b, the opening degree of the control valve 22 varies, so that the negative pressure introduced to the actuator changes to vary the throttle opening degree.

A release valve 21 is provided for ON/OFF control to feed or not to feed atmosphere into the actuator. Therefore, during fixed speed traveling control, the release valve 21 is closed to shut off the atmosphere. However, when a cancel signal C1 is fed, the CPU 11 turns the release signal a to high level to turn OFF the transistor Tr2, and power supply to the release valve 21 is cut off, and this valve is opened. Since there are also other cancel signals, the OR gate G2 supplies, including other cancel signal C0, to the base of transistor Tr2. In order to nullify the change of control output b in this period, cancel signals C0, C1 are fed also to the OR gate G1.

In this kind of fixed speed traveling control apparatus, it is sometimes predicted that the fixed speed traveling control is not be interrupted in the case where the cancel signal C1 is fed to the CPU 11 due to program runaway or other cause, and to avoid this, the cancel signal C1 is also directly applied to the transistor Tr2, from the hardware of cancel circuit 12 through OR gate G2. Besides, the current supply into the release valve 21 is forced to be cut off by stop lamp switch B of normally ON type which acts reversely in cooperation with the switch A.

Thus, when it is attempted to guarantee the cancellation of fixed speed control by double or triple means, there arises a new problem. That is, when the brake pedal is stepped on while one of the two stop switches A, B, for example A is defective, the other stop switch B may be put in action. In this case, since cancel signal C1 is not generated, the CPU 11 does not interrupt fixed speed traveling control. Therefore, when stepping off the brake pedal and the switch B is turned ON again, traveling is resumed, from this point, at the set car speed, which is not preferable. This is because a driver believes that, during a fixed speed traveling, when the brake pedal is stepped on, the fixed speed traveling is canceled, and that it is not restored unless resume operation is effected. In such a case, generally, as the actual car speed slows down, difference from the set car speed is widening, and the control duty is approaching 100%, which means a sudden acceleration. Accordingly, this speed change will confuse the driver. It is essential to overcome the problems hereinbefore.

SUMMARY OF THE INVENTION

It is hence a primary object of this invention to present a fail-safe circuit of a fixed speed traveling apparatus newly improved in order to solve the above-discussed problem.

In order to accomplish the above-mentioned object, a fail-safe circuit of a fixed speed traveling apparatus in accordance with the invention, wherein there are provided with a control valve for introducing an engine negative pressure to an actuator which controls a throttle opening degree, a release valve for introducing an atmospheric pressure to an actuator and a control circuit for controlling the control valve and the release valve, and at brake ON, a first cancel signal is supplied to the control circuit to cancel a fixed speed traveling and to open a current passage of the release valve, is characterized in that there is further provided with means for generating a second cancel signal to the control circuit in the case where the current passage of the release valve is open.

In a preferred embodiment, the means for generating a cancel signal detects that current no longer flows in the current passage of the release valve, and generates a second cancel signal to the control circuit.

In another preferred embodiment, in the current passage of the release valve a switch is provided to open at brake ON, and the means for generating a cancel signal detects that the switch is open and generates a second cancel signal to the control circuit.

In a further preferred embodiment, the means for generating cancel signal comprises a resistance provided in a current passage of the release valve, and a comparative circuit for comparing a voltage drop of the resistance with a predetermined difference level and for generating the second cancel signal when the voltage drop is more than the predetermined difference level.

In a still further preferred embodiment, a switch to be opened at brake ON, and another switch to be opened by the second cancel signal are provided in a current passage of the release valve.

In a further preferred embodiment, a switch is connected to the control valve in series and is turned off responsive to the second cancel signal to close the control valve.

In a still further preferred embodiment, the second cancel signal is supplied to a transistor for driving the release valve and/or to a tansistor for driving the control valve to close the control valve and/or the release valve.

According to the invention, the circuit to detect opening of the current passage of release valve(CMP which is mentioned later) produces a detection output when current no longer flows in the current passage of release valve as the second stop lamp switch B is turned off. At this time, when the first stop lamp switch A is defective and the first cancel signal C1 is not fed to the CPU, signal a to open the release valve is not produced because the CPU is executing the program of fixed speed traveling control. Accordingly, when this detection output occurs, a second cancel signal C2 is generated to interrupt the control of the CPU and turn off the second transistor Tr2 by hardware. This circuit is G3 which is mentioned later. Thus, the effect of trouble of stop lamp switches may be kept to a minimum.

Therefore, although the stop lamp switch A in the cancel signal generating side of the two stop lamp switches A, B becomes defective, another cancel signal can be generated in the release valve control side B, so that sudden acceleration or other trouble after releasing of the brake may be prevented.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

Figure 1:
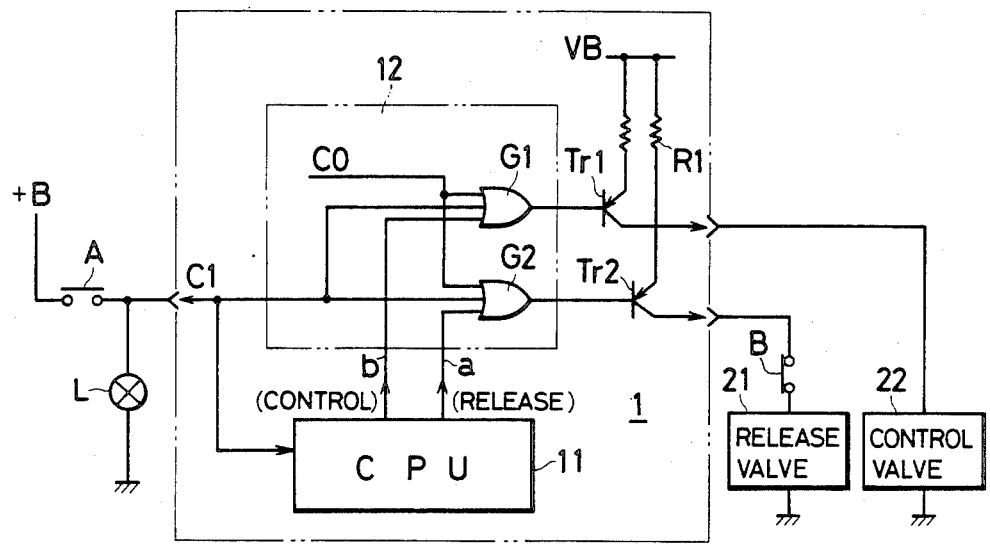
FIG. 1 shows a conventional configuration of a failsafe circuit of a fixed speed traveling apparatus for automobile.

Referring now to the drawings, embodiments of the invention are described below.

Figure 2:
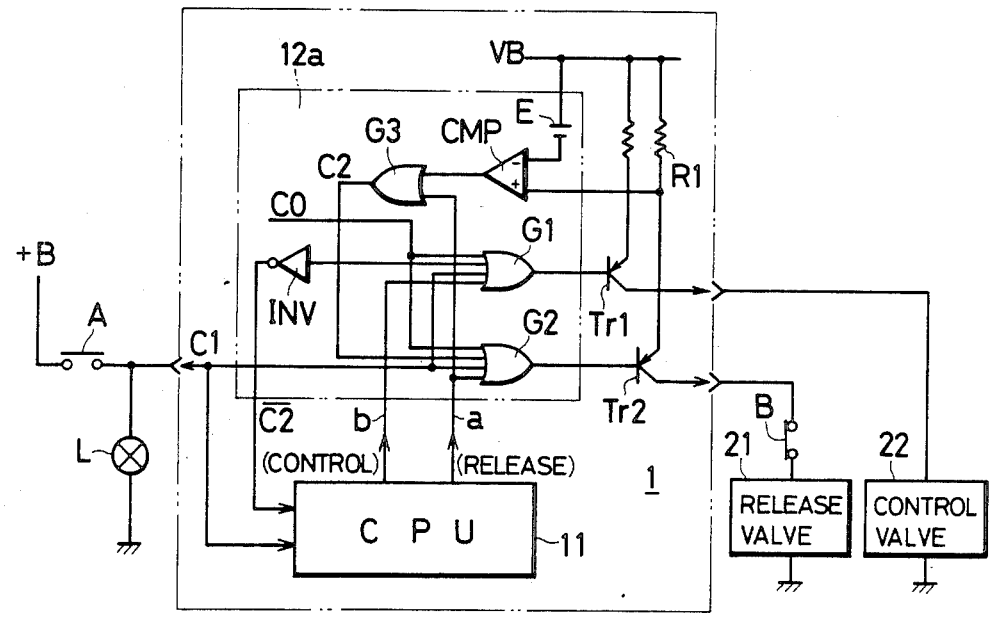
FIG. 2 is a circuit configuration showing one of the embodiments of this invention.

FIG. 2 shows one of the embodiments of this invention, in which there are provided a fixed speed traveling control apparatus 1, CPU 11 as its control center, and a fail-safe circuit 12a for backup use. This fail-safe circuit 12a is often integrated into the custom IC together with power source control circuit and others of CPU 11. The CPU 11 possesses a program for fixed speed traveling control, and when a voltage B is applied from a stop lamp switch A(normally OFF) which is turned ON when the brake pedal is stepped on, it is used as cancel signal C1, and the fixed speed traveling control is interrupted. This switch A is for lighting up the stop lamps L in the rear part of the car.

The fixed speed traveling control is effected by varying the value of engine negative pressure to be introduced into an actuator 45(see FIG. 3 mentioned below) for control of throttle opening degree through a control valve 22. That is, by the fixed speed traveling program of CPU 11, a duty control signal b is delivered, and it is supplied into transistor Tr1 through OR gate G1, and this transistor passes a pulsive current to the control valve 22. As the duty of this current varies depending on the control signal b, the opening degree of the control valve 22 varies, so that the negative pressure introduced to the actuator changes to vary the throttle opening degree.

A release valve 21 is a device for ON/OFF control to feed or not to feed atmosphere into the actuator. Therefore, during fixed speed traveling control, the release valve 21 is closed to shut off the atmosphere. However, when a cancel signal C1 is fed, the CPU 11 turns the release signal a to H(high) to turn off the transistor Tr2, and power supply to the release valve 21 is cut off, and this valve is opened. Since there are also other cancel signals, the OR gate G2 supplies, including other cancel signal C0, to the base of transistor Tr2. In order to nullify the change of control output b in this period, cancel signals C0, C1 are fed also into the OR gate G1.

It is sometimes predicted that the fixed speed traveling control is not be interrupted in the case where a cancel signal C1 is fed to the CPU 11 due to program runaway or other cause, and to avoid this, a cancel signal C1 is also directly applied to the transistor Tr2 from the hardware of cancel circuit 12 through OR gate G2. Besides, the current supply into the release valve 21 is forced to be cut off by stop lamp switch B of normally ON type which acts reversely in cooperation with the switch A.

Figure 3:
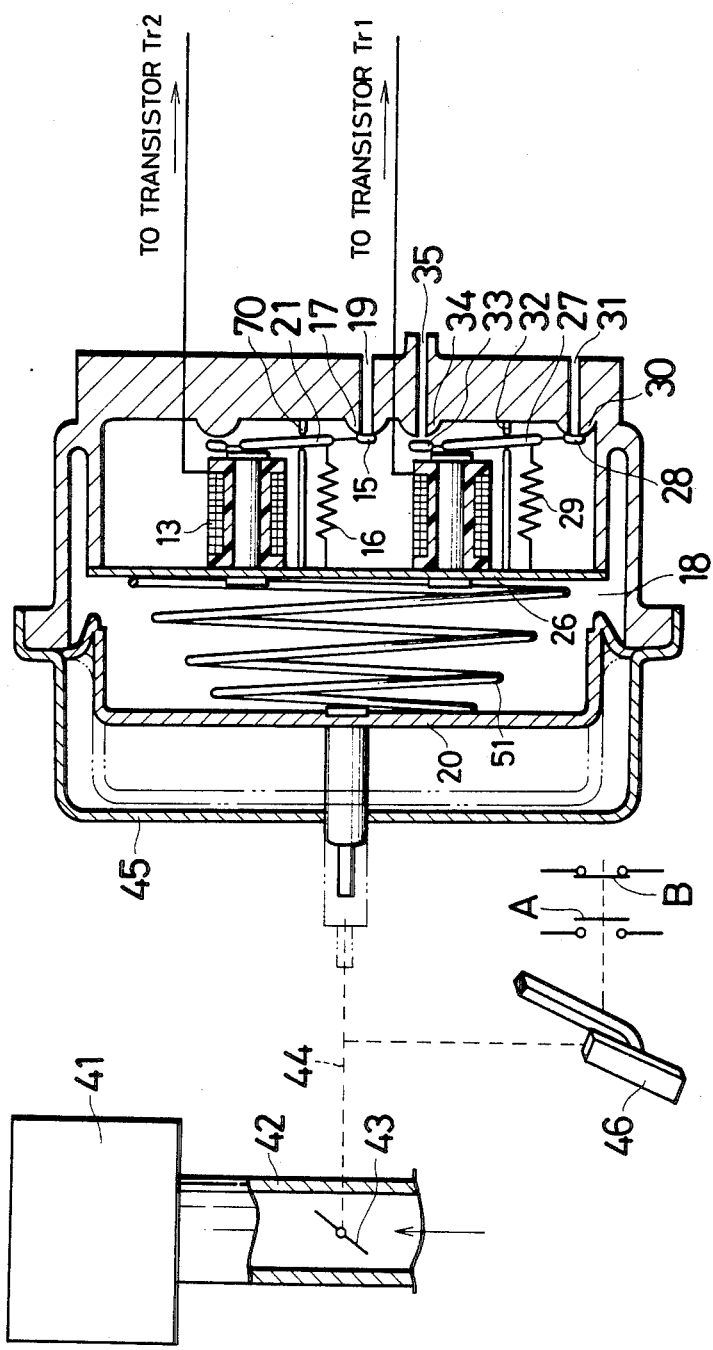
FIG. 3 is a sectional view showing an actuator 45 and the composition related to the actuator 45.

FIG. 3 is a sectional view showing and actuator 45 and the composition related to the actuator 45. A throttle valve 43 is mounted on an aspiration route 42 as driving source of automobile in an internal combustion engine 41 by a spark ignition. Through a link mechanism 44 the throttle valve 43 is both driven by an actuator 45 for automatic control and operated by stepping a accelerator pedal 46.

When one of the transistor Tr2 and switch B is OFF, a solenoid 13 for a release valve 21 included in the actuator 45 is deenergized. Therefore, a valve body 15 in the release valve 21 is displaced away from a valve seat 17 by elastic force of a spring 16 around a fulcrum 70. The diaphragmatic cell 18 in the actuator 45 is open to the atmosphere through a hole 19 and the diaphragm 20 is kept to be energized by the spring 51.

Opening degree of the throttle 43 is controlled by function of the control valve 22 when an automobile continues traveling at a preset speed. The solenoid 26 for the control valve 27 is controlled by varying duty of exciting current by the transistor Tr1. When the transistor Tr1 is OFF and the solenoid 26 of the control valve 27 is not excited, the valve body 28 in the control valve 27 is spacing from the valve seat 30 by the elastic force of the spring 29, whereby, the diaphragmatic cell 18 is open to the atmosphere through a hole 31. This control valve 27 is angularly displaceable around the fulcrum 32. While the valve body 28 is from the valve seat 30, another valve body 33 is seated on the valve seat 34, whereby, the valve hole 35 is disconnected from the diaphragmatic cell 18. The valve hole 35 communicates with the upstream side of the throttle valve 43 in an aspirator 42, keeping negative pressure. When the transistor Tr1 is ON, the solenoid 26 for control valve is excited. Accordingly, the control valve 27 gets into the state as shown in FIG. 3, in which the valve body 28 is seated on the valve seat 30, the valve body 33 is spaced away from the valve seat 34, thereby the diaphragmatic cell 18 having negative pressure. Since the diaphragmatic cell 18 has therein negative pressure, the diaphragm 20 is displaced rightward in FIG. 3, with resisting the elastic force of the spring 51, whereby the throttle valve 43 is controlled so that the opening degree thereof becomes large by the link mechanism 44.

In the case where the automobile is not traveling at a preset speed, namely, even if the automatic control of speed is canceled, the automobile can be traveling after resetting at the preset speed by function of a resume switch when real automatic speed is higher than the preset speed of such as 40 km per hour. Accordind to the invention, in order to detect presence of an electric current flowing in a current passage of release valve 21 composed of power supply VB, resistor R1, transistor Tr2, and switch B, a fail-safe circuit 12a accommodates in itself a comparator circuit CMP to compare the voltage drop occurring in an existing current limiting resistor R1 with reference value E, an OR gate G3 which generates a second cancel signal C2 in the case where the transistor Tr2 is kept ON by fixing the release signal a at L(low) level owing to the CPU 11 when the comparator circuit CMP detects current failure, and an inverter INV which inverts this signal C2 and applies to the CPU 11. The output of the OR gate G3 is also fed to the OR gates G1, G2.

Figure 4:
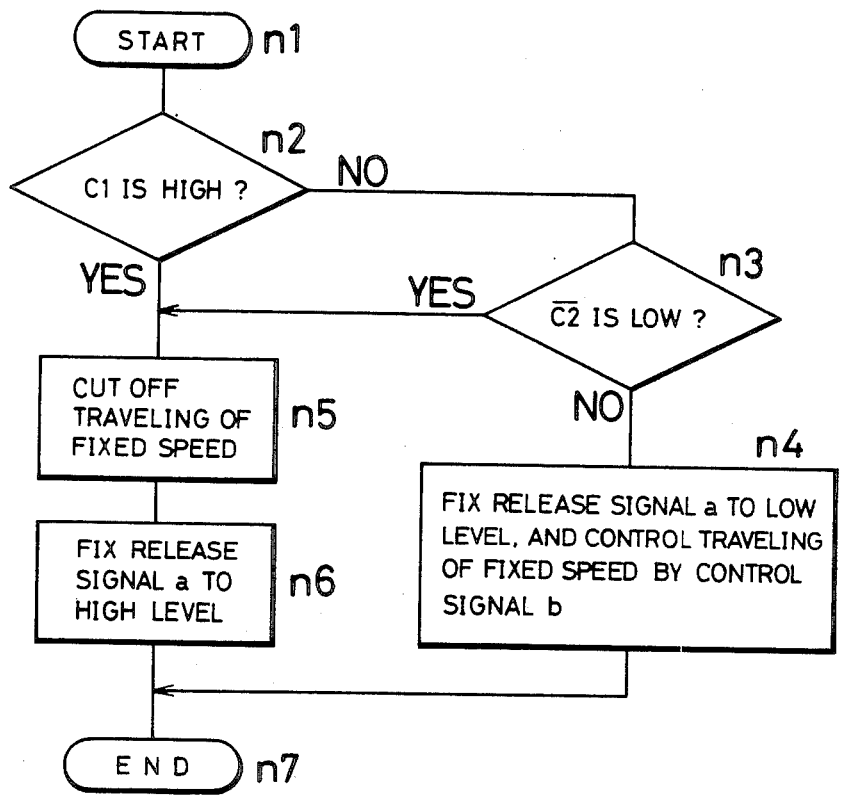
FIG. 4 is a flow chart diagram for explaining operating of a proccessing circuit.

The operation will be explained referring to the FIG. 4. When the CPU 11 is nomally operated to perform fixed speed traveling control, the release signal a is a L(low) level and the transistor Tr2 is ON. Thereby, the release valve 21 is closed. The duty control signal b possesses a duty suited to the speed control, and the transistor Tr1 is intermittently driven. In other words, a brake pedal 46 is not stepped thereinto, and the switch a is turned off, whereby a step n1 flows a step n3 through a step n2. In the step n3, it is decided whether or not an output $\overline{C2}$ of the inverter INV is a low level. Owing to conducting the transistor Tr2 the voltage drops in the resistance R1. Thereby, output C2 of the comparator circuit CMP goes low level. The output $\overline{C2}$ of the inverter INV goes high level. Therefore, the fixed speed traveling can be accomplished in a step n4. In this state, when the brake pedal 46 is stepped on and the switches A, B function normally, A is ON and B is OFF. When switch A is ON, a first cancel signal C1 at H(high) level enters the CPU 11, thereby the step n2 flowing to a step n5 in which the CPU 11 then interrupts the fixed speed traveling control to render the release signal a H(high) at the step n6. As a result, the transistor Tr2 is turned OFF, and the release valve 21 is opened to admit atmospheric pressure to the diaphragmatic cell 18. At this time, in the case where the release signal a remains at L(low) level due to program runaway or other cause, since the cancel signal C1 is directly fed into the OR gate G2, the transistor Tr2 is turned OFF by hardware. In addition to this electric duplexing function, the stop lamp switch B is also turned OFF, so that current supply into the release valve 21 is cut off, even when for example, the OR gate G2 or transistor Tr2 is defective.

To the contrary, in the event of a trouble in which the switch A is not turned ON when the brake pedal is stepped on, the first cancel signal C1 is not produced. But the switch B is normally turned off and current supply to the release valve 21 is interrupted so that the voltage drop of resistor R1 does not occur. As a result, the (+) input of the comparator circuit CMP rises up to VB (>E), so that the output goes high level. Since this detection output is also produced when the transistor Tr2 is normally OFF or the switch A is normally working, the release signal a from the CPU 11 is also used in order to distinguish therefrom. Since this release signal a remains at low level unless the cancel signal C1 is fed, the high level detection output of the comparator circuit CMP passes through OR gate G3 to become a second cancel signal C2. This signal C2 is inverted by the inverter INV, and as the result of this, an obtained signal $\overline{C2}$ enters the CPU 11, thereby the step flowing to the step n5 in which the CPU 11 interrupts the fixed speed traveling control even when the first cancel signal C1 is not supplied. However, since it is also presumed that the release signal a may not be at high level due to program runaway or other trouble, the output C2 of the OR gate G3 is directly fed into the OR gates G1, G2 also in order to back up from the hardware.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A fail-safe circuit of a fixed speed traveling apparatus comprising:
   a control valve for introducing an engine negative pressure to an actuator which controls a throttle opening degree; a release valve for introducing an atmospheric pressure to an actuator;
   a control circuit for controlling the control valve and the release valve;
   a means for generating a first cancel signal which makes the control circuit release a fixed speed traveling at brake ON;
   a means for controlling open and close of a current passage of the release valve at brake ON; and
   a means for generating a second cancel signal fed to the control circuit by detecting that the current passage of the release valve is opened.

2. A fail-safe circuit of a fixed speed traveling apparatus as claimed in claim 1, wherein the means for controlling open and close is provided in the current passage of the release valve, which means is switching means to open at brake ON, and the means for generating the second cancel signal detects that the switching means is opened and generates the second cancel signal fed to the control circuit.

3. The fail-safe circuit of a fixed speed traveling apparatus as claimed in claim 1, wherein the means for generating a second cancel signal detects that current no longer flows in the current passage of the release valve, and generates a second cancel signal fed to the control circuit.

4. The fail-safe circuit of a fixed speed traveling apparatus as claimed in claim 1, wherein the means for generating a second cancel signal comprises:
   a resistance provided in a current passage of the release valve; and
   a comparative circuit for comparing a voltage drop of the resistance with a predetermined difference level and for generating the second cancel signal when the voltage drop is more than the predetermined difference level.

5. The fail-safe circuit of a fixed speed traveling apparatus as claimed in claim 1, wherein a switch to be opened at brake ON, and another switch to be opened by the second cancel signal are provided in a current passage of the release valve.

6. The fail-safe circuit of a fixed speed traveling as claimed in claim 1, wherein a switch is connected to the control valve in series and is turned off responsive to the second cancel signal to close the control valve.

7. The fail-safe circuit of a fixed speed traveling apparatus as claimed in claim 1, wherein the second cancel signal is supplied to a transistor for driving the release valve and/or to a tansistor for driving the control valve to close the control valve and/or the release valve.

8. The fail-safe circuit of a fixed speed traveling apparatus as recited in claim 3, wherein the means for generating a second cancel signal comprises:

a resistance provided in a current passage of the release valve; and a comparative circuit for comparing a voltage drop of the resistance with a predetermined difference level and for generating the second cancel signal when the voltage drop is more than the predetermined different level.

* * * * *